United States Patent [19]

Ueda

[11] 4,410,795

[45] Oct. 18, 1983

[54] HEATING APPARATUS WITH PROGRAMMABLE TIMER

[75] Inventor: Shigeki Ueda, Nara, Japan

[73] Assignee: Matsushita Electric Industrial Co., Ltd., Osaka, Japan

[21] Appl. No.: 345,375

[22] Filed: Feb. 3, 1982

Related U.S. Application Data

[63] Continuation of Ser. No. 148,484, May 9, 1980, abandoned.

[30] Foreign Application Priority Data

May 15, 1979 [JP] Japan .................................. 54-60103

[51] Int. Cl.³ .............................................. H05B 1/02
[52] U.S. Cl. ................................... 219/492; 219/506; 340/711
[58] Field of Search ............... 219/492, 493, 498, 506, 219/508–510, 10.55 B; 364/900, 705; 340/711

[56] References Cited

U.S. PATENT DOCUMENTS

| | | | |
|---|---|---|---|
| 4,119,957 | 10/1978 | Sasaki et al. | 219/10.55 B |
| 4,158,759 | 6/1979 | Mason | 219/506 |
| 4,206,872 | 6/1980 | Levine | 219/492 |
| 4,225,776 | 9/1980 | Meisner et al. | 364/705 |
| 4,328,408 | 5/1982 | Lawson | 219/506 |

OTHER PUBLICATIONS

4-Bit Microcomputer Preprogrammable Texas Instruments C-1976 TMS 1117.

*Primary Examiner*—M. H. Paschall
*Attorney, Agent, or Firm*—Spencer, Kaye & Frank

[57] ABSTRACT

A heating apparatus, or more particularly a heating-time displaying means which is applicable for a heating apparatus with a programmable timer which is capable of controlling the sequence heating. The heating apparatus comprises heating sources such as magnetron and/or heater for heating a product to be heated, output switching means for switching the output of said heating source into at least two steps, output setting means for presetting the output specified by said output switching means, timer means for controlling the heating time, heating time setting means for presetting the heating time to said timer means, a memory for storing the output and heating time entered by said output setting means and said heat time setting means, display means for displaying the entered output and heating time, and a main controller for controlling said heating source and said memory and all of said means, and stage recall means for recalling the heating pattern of a selected stage. The main controller has a function of calculating the total heating time of sequence heating so that either the total heating time or the heating time of each stage is indicated on the display means in accordance with a command from said stage recall means.

1 Claim, 11 Drawing Figures

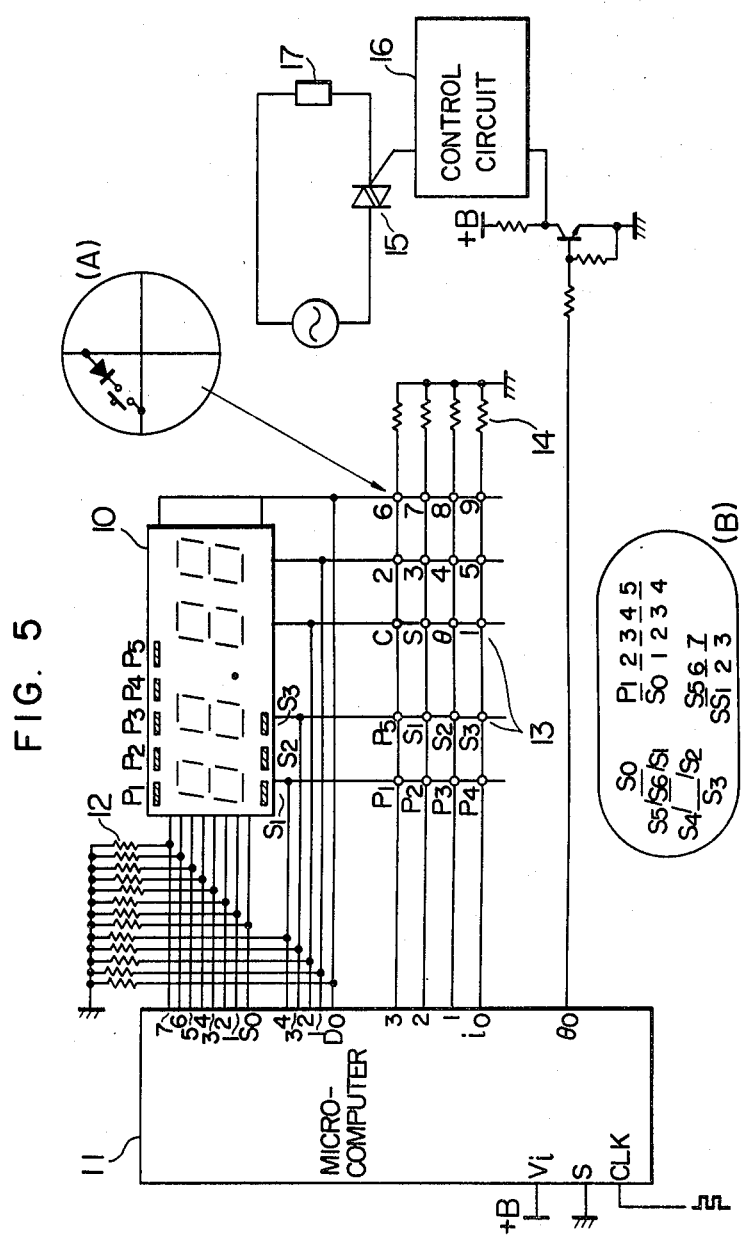

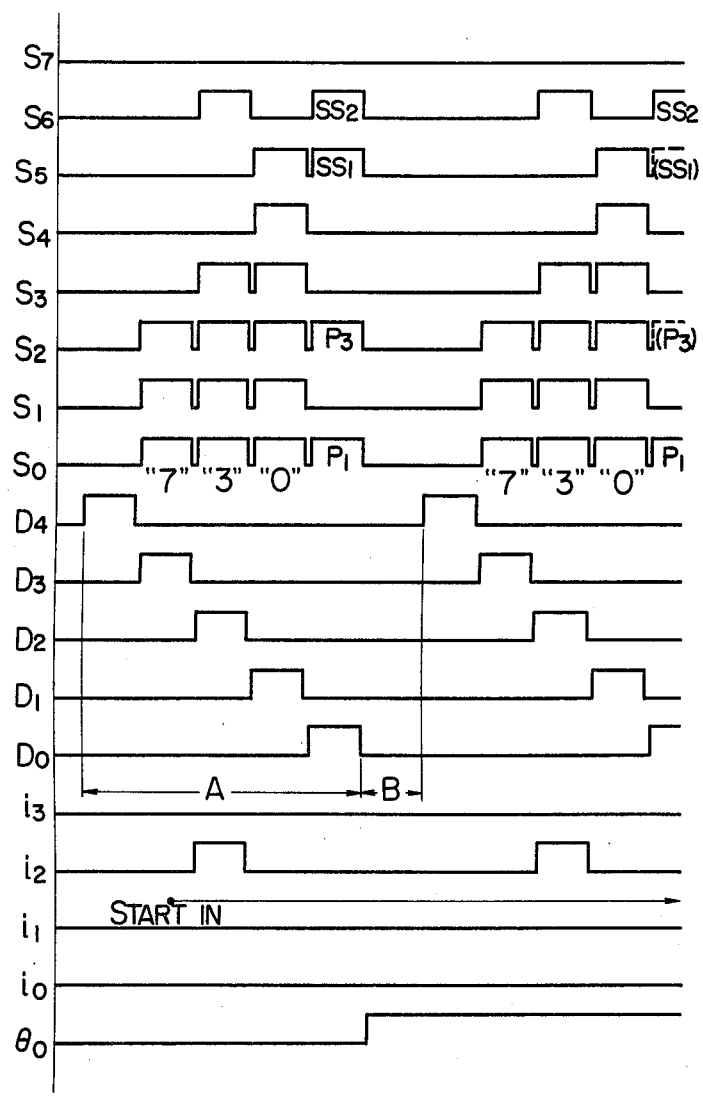

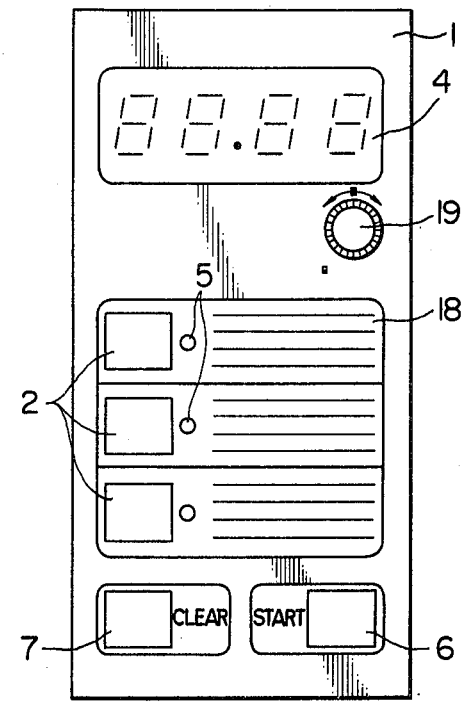
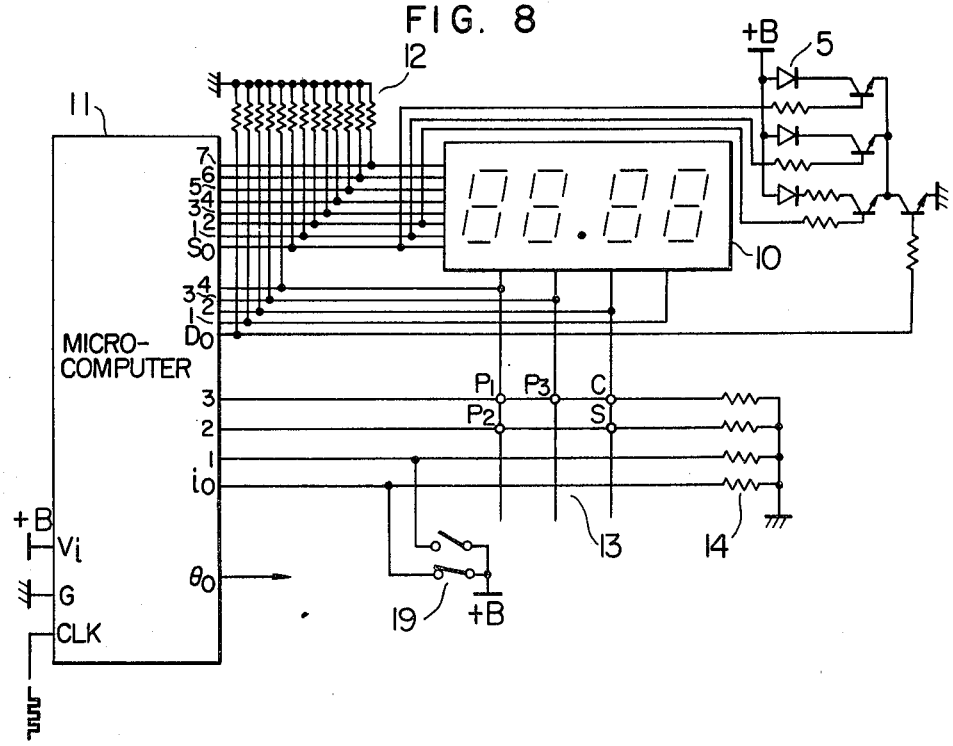

HEATING APPARATUS WITH PROGRAMMABLE TIMER

This is a continuation of application Ser. No. 148,484 filed May 9, 1980, now abandoned.

This invention relates to a heating apparatus and more particularly to a heating time display means in a heating apparatus with a programmable timer which is capable of controlling the sequence heating.

In a prior art heating apparatus with a programmable timer such as a microwave oven or an electric oven, in general, the console panel has such a configuration as shown in FIG. 1. That is, on a console panel 1, are mounted output keys 2 (P1 to P5) (output setting means) for selecting an output, number keys 3 (0 to 9) which are heating time setting means for setting the heating time, and display 4 for displaying the output and heating time. FIG. 2 is a detailed view of the console panel in FIG. 1. In the illustrated case, the output can be switched over in five steps and the corresponding output 5 indicators (which are referred to as output status indicators abreviated hereinafter as PS) appear at the upper part of the display 4. Further, there are provided on the console panel 1 a START key 6 for commanding the start of heating and a CLEAR key 7 for erasing the input program.

With such a prior art console panel, sequence heating will be achieved according to the operation procedure and the corresponding indication contents, as follows. First, the operator or user selects an output for the first stage (stage which is desired to be first executed). For example, when the user pushes an output key P3, "P3" of the output status display a is lit and the number lights remain zero or blank on the display 4. Next, a desired heating time is set by means of the use of number keys 3. For example, pushing of number keys "2", "3" and "0" will cause "2.30" to appear on the display 4, meaning 2 minutes and 30 seconds. By the above operation the programming for the first stage is completed. Subsequently, the user selects an output for the second stage. For example, by pushing a P1 output key. "P3" of the output status indicators and "2.30" of the number digits are erased, and "P1" in the output status display is lit and the number digits become zero or blank. In the similar way to the first stage, the heating time may be set as, e.g., "5.00" to the second stage with the use of number keys 3. In such a prior art programmable timer, only the contents of the setting stage are displayed on the display 4 in programming, and if the contents of the previous stages are required, the contents depend on the memory of the user.

After the above-mentioned programming procedure (the heating time and output status of the last stage are indicated on the display), if the user pushes the START key, then the indication on the display will disappear and the heating time and output status (PS) of the first stage will appear on the display. That is, the indication on the display changes from 'P1/5.00' to 'P2/2.30'. Therefore, the user can easily know the remaining time necessary to terminate the currently executing stage, and on the contrary, the user can not know what type of program has been set to the next second stage. In addition, the user must add the current heating time which appears on the display, to the subsequently set heating time (which the user must also bear in mind), in order to known when all the heating ends. Since the time on the display changes (counts down or decrements) momentarily, however, the user feels troublesome doing so. Furthermore, in order to change a desired stage heating time, the user is required to erase or clear the contents of all the stages already selected and to restart programming again from the beginning.

It has been pointed out by users that prior art programmable timer has many problems with respect to the controllability, as has been described above, and therefore, it has been strongly demanded to improve the controllability.

Accordingly, it is an object of the present invention to provide display means wherein a desired stage can be separately checked at any time without relying upon user's memory and the user can easily know when all the sequence heating ends.

It is another object of the present invention is to make it possible to connect the heating pattern of any desired stage in the already completed programming.

It is a further object of the present invention to provide means which allows the erasing of a desired stage alone in the already completed programming or in a program, in addition to the erasing of all the stages, at the time of sequence heating.

The above and other objects and advantages of the present invention will become apparent by reference to the following description and the accompanying drawings, in which:

FIG. 5 is a circuit diagram of the console panel of FIG. 3;

FIG. 6 is a timing chart of the circuit operation of the console panel in FIG. 3;

FIG. 7 is a front view of a console panel according to another embodiment of the present invention; and FIG. 8 is a circuit diagram of the console panel in FIG. 7.

Figure 1:
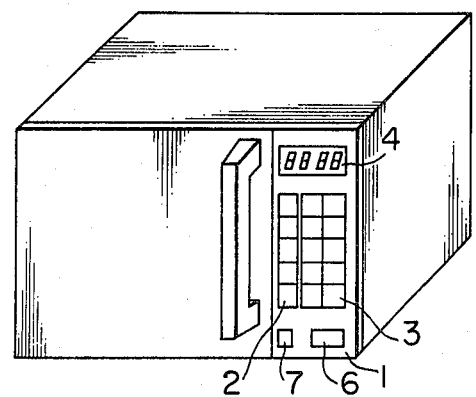
FIG. 1 is a perspective diagram of a prior art heating apparatus.
Figure 2:
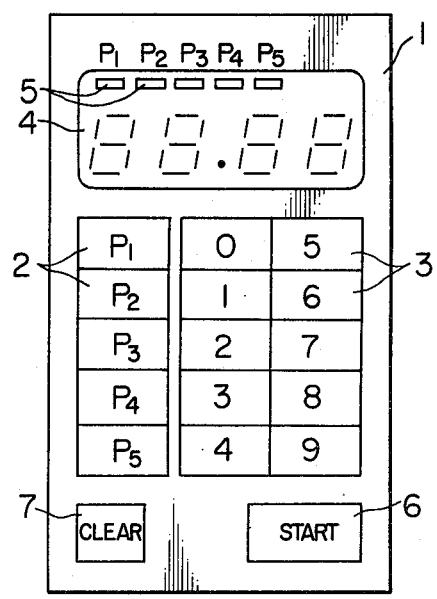
FIG. 2 is a detailed view of a console panel used for the prior art heating apparatus in FIG. 1.
Figure 3:
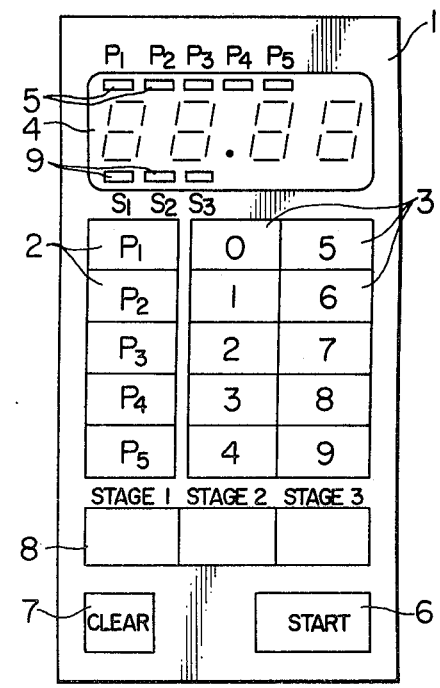
FIG. 3 is a front view of a console panel according to one embodiment of the present invention.
Figure 4A:
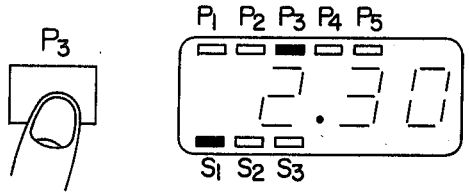
FIGS. 4A to 4D show jointly an example of operation procedure of the console panel in FIG. 3.
Figure 4B:
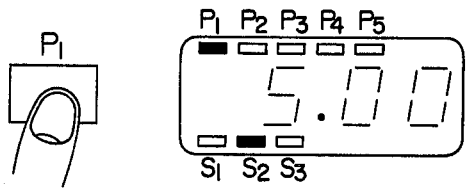
Figure 4C:
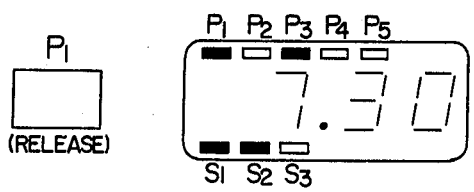

Referring now to FIG. 3, there is shown an embodiment of a console panel 1 according to the present invention which is the same as the prior art console panel of FIG. 2, except that stage recall keys 8 and stage indicators 9 are added. With the console panel of the present invention, sequence heating is achieved as follows. The operation procedure and the corresponding indication contents will be explained in detail with reference to FIGS. 4A to 4D. First, an output at the first stage is selected (see FIG. 4A). For example, when a user or operator pushes P3 of output keys 2, then P3 of output status indicators 5 is energized or indicated on a display 4, the number digits on the display indicate zero or blank, and S1 of the stage status indicators 9 lights up. In this embodiment, as long as the P3 key remains pushed, the heating time of P3, i.e., the heating time at the first stage can be set. More specifically, with the P3 key pushed, the pushing of number keys "2", "3" and "0" in this order allows the setting of "P3/2.30/S1". After setting the heat time, release of the P3 key means the completion of programming at the first stage. Subsequently, an output, for example, P1 at the second stage is selected (see FIG. 4B). In the similar way, pushing the P1 key will cause the contents on the display 4 to change from "P3/2.30/S1" to "P1/zero or blank/S2".

If the user sets the heating or cooling time with the use of selected number keys, with the P1 key pushed; then a heating pattern "P1/5.00/S2" can be set at the second stage. Thereafter when the P1 key is released, the programming at the second stage is completed, results in the fact that on the display 4, P1 and P3 will light up in the output status indicators 5, the number digits will display "7.30" which is a sum of 2 minutes and 30 seconds and 5 minutes, and S1 and S2 will light up in the stage status indicators 9 (see FIG. 4C). In other words, at the time that the programming has been completed, the operator can know at a glance what output is selected, what stage sequence is being built in, and how long it takes until the final heating.

In the present embodiment, provision of the stage recall keys 8 allows the reindication of the heating pattern of a selected stage on the display 4, at any point in the programming. More specifically, if "P1/P3/7.30/S1/S2" is indicated on the display 4 and the operator pushes the 'STAGE 1' key, then the contents of the display 4 changes again to those of the first stage, i.e., "P3/2.30/S1" (see FIG. 4A), in which case, the operator can change the time and/or output already set. Releasing the 'STAGE 1' key the total time indication is mode again on the display 4 (see FIG. 4C). In the similar way, "P1/5.00/S2" can be invoked or recalled using a 'STAGE 2' key for correction or check (see FIG. 4B). With the total indication being provided on the display 4, push of a CLEAR key 7 will clear all the contents; while, with a desired stage recall key being pushed, push of the CLEAR key will celar only the associated stage contents, whereby programming errors in the sequence heating or cooking can be much conveniently corrected when compared to a prior-art console panel in which it is always necessary to restart programming in case of such programming errors.

Figure 4D:
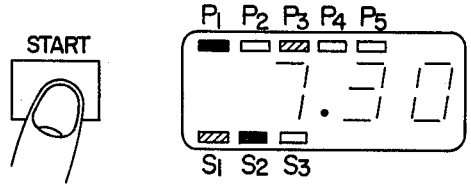

After such programming, if the operator pushes a START key 6, then the executing P3 at the first stage of the output status indicators 5 will go on and off, P1 at the second stage thereof will remain on, the total time displayed on the number digits will count down or decrement, S1 in the stage status indicators 9 will go on and off, and S2 therein will remain on, as seen best in FIG. 4D. This allows the operator to check at a glance the output and stage in execution and the remainding execution time. In this connection, while the operator pushes a selected stage recall key, only the contents associated with the selected stage can be also indicated on the display. For example, while the operator pushes the STAGE 1 key, "P3/2.30/S1" appears on the display 4 so that the output status indicator P3 and the stage status indicator S1 will flash and "2.30" will decrement momentarily. Release of the STAGE 1 key will again cause the total indication to be provided on the display. When the operator pushes the STAGE 2 key, indication "P1/5.00/S2" will appear without momentarily decrementing "5.00".

In this way, provision of the stage recall keys and indication of a total pattern will allow the operator to selectively check and correct, as necessary, all the contents of the heating pattern and the partial contents of each stage during sequence cooking, thereby minimizing faulty operations due to programming errors and enhancing the controllability.

There is shown in FIG. 5 a circuit diagram embodying the circuit employed for such a console panel, wherein a fluorescent indicator tube 10 constructing the display 4 consists of four unit or figure of digits each having 7 segments, 5 status segments or indicators for controlling the output status and 3 stage status indicators. The 5 digits are scanned and dynamically energized by digit scan ports $D_0$ to $D_4$ of a microcomputer or microcomputers 11 which forms a main controller. The microcomputer 11 contains a memory in which the output and heating time are stored. On the other hand, the 8 status segments are connected in parallel with the 7 number segments. Display data are transmitted from 8 segment data ports $S_0$ to $S_7$ of the microcomputer 11 to the 3 status segments (refer to FIG. 5, (B)). Pull-down resistors 12 are ones for pulling down the associated lines to "L" level when selected digit scan ports and segment data ports are at the off state.

A key matrix 13 is a combination array of a total of 20 keys on the console panel 1, i.e., the 5 output keys, the 10 number keys, the 2 function keys (START and CLEAR), and 3 stage recall keys. Signals at digit scan ports are used to scan the columns of the key matrix so that the key information signals are inputted to the corresponding input ports $i_0$ to $i_5$ of the microcomputer 11. Each interconnection in the key matrix consists of a diode and a momentary push button switch, as clearly seen in FIG. 5, (A). Pull-down resistors 14 are ones for pulling down the associated input ports on which key data signals are absent to 'L' level.

With the arrangement as described above, when sequence heating is programmed according to key operations as shown in FIG. 4 and then the operator pushes the START key, an output port $Q_0$ goes to a 'H' level, thereby a control circuit 16 of a semiconductor switch 15 starts to operate. As soon as the semiconductor switch 15 is turned on by means of a signal on the output port $Q_0$, current supply to a heating source or heating sources 17 such as magnetron and/or heater starts and heating of an object material to be heated starts. On the other hand, the microcomputer 11 is provided with a CLK terminal for clock signal and as a clock signal is applied to the CLK terminal, the set heating time decreases. When the set heating time has been elapsed, the output port $Q_0$ changes to an 'L' level, if necessary, so as to sound a buzzer or provide an appropriate alarm. Change over of the output may be achieved by turning on or off a signal on the output port $Q_0$ with a fixed duty ratio. For example, when full power is provided for P1, the duty ratio is 100%, and when half the full power is allocated for P3, the $Q_0$ signal is switched on and off with a duty of 50%.

FIG. 6 shows a timing chart of the circuit in FIG. 5 at the time that the START key is depressed in FIG. 4D, wherein waveforms at points $S_0$–$S_7$, $D0_0$–$D_3$, $i_1$–$i_3$, and $Q_0$ in FIG. 5 are given. 'A' and 'B' indicate display key fetch cycle and control cycle, respectively. In the 'A' cycle, digit signals and segment data generate to energize a display tube 10 dynamically. At the same time, the digit signals act to fetch the information on the key matrix. Since the START key is now depressed, the START key information is time shared with a $D_2$ scan timing and sent to the input port $i_2$. The information is decoded in the control cycle 'B', then the $Q_0$ port changes to a "H" level and in the next display cycle (which corresponds to SS1 in FIG. 6) the indicators P3 and S1 on the display go on and off. A circuit arrangement embodying the present invention and the associated time sharing process has been described in the above.

In the present embodiment of the present invention, the output keys 2 and the stage recall keys 8 may be used in various other manners. For example, the operator may push a desired stage recall key first to declare the stage of program to be set, and then a selected output key and the associated number keys may be pushed in a continuous order. In this case, the operator may also push the associated number keys after releasing the selected output key. The total time may be displayed at the time of depressing the START key, or alternatively a new program end key or total display key may be added. In short, an important point or feature of the present invention is that there is provided means that allows displaying of the heating pattern for each step and the total heating pattern in the course of sequence heating, at any time at the operator's will.

In FIGS. 7 and 8, there is shown another embodiment of the present invention in which the total heating pattern and the heating pattern at each step can be displayed without any stage recall key. FIG. 7 and FIG. 8 show a control panel and the circuit configuration thereof, respectively. Three output keys 2 are provided, in this embodiment, to allow a selection of one of the outputs in 3 steps. Next to each of the output keys 2, is arranged an output status indicator 5 which basically consists of a light emission diode and is dynamically energized together with a display tube 10 by means of a digit scan port $D_0$. The light signals to the indicators 5 are transmitted respectively from segment data ports $S_0$ to $S_2$. There is attached by the side of the output keys 2 a table 18 in which the different heating times of a product or food for different outputs are provided as shown in FIG. 7. An encoder 19 is of the rotary type described in Japanese Patent Layed-Open Publication No. 80280/78. The operator can adjust the heating time by rotating a knob on the console panel that is coupled to the encoder 19. With such an arrangement of the console panel according to another embodiment of the present invention, programming is conducted as follows. The operator first selects one of the output keys 2 and pushes it. As long as the operator pushes the selected output key, the heating time necessary for the selected output can be set with the use of the rotary encoder 19. In this case, the corresponding output status indicator alone lights up on the display. After the end of the first stage, the operator selects an output key for the second stage. Then the indication on the display is eliminated and it becomes possible to make the programming of the second stage. The procedure up to this point is the same as that in FIGS. 4A to 4C of the aforementioned embodiment of the present invention, in which case, as soon as the release of the output key selected for the second stage, the total time and the output status indicators of the first and second stages are all displayed. However, it will be appreciated that the stage indicators are omitted in the present embodiment. If such programming is designed so that an identical output can not be selected among stages, that is, if heating sequence such as a combination of output keys *P1-P1, or P1-P2-*P1 is inhibited, a desired stage can be invoked or fetched by pushing the already selected output key instead of the stage recall key. For instance, after selecting a combination of output keys P1 and P2, repush of the output key P1 will cause the contents of the first stage to apear again on the display without changing the stage. It goes without saying that when the operator releases the output key P1 the total time again appears on the display. In addition, it is possible to change or correct the contents of the already set stages.

It will be appreciated that the present embodiment may be properly modified in various manners. For instance, it is possible to make such that when programming it allows any combination of the outputs, and instead of it, it makes impossible to display the contents of the previous stages while programming, but after the heating is started the heating pattern of any stage selected by an output key may be displayed.

With the arrangements as has been discribed above, the present invention allows a selected check and correction of the contents of the total heating pattern and the heating pattern for each stage at the time of sequence heating, thereby minimizing faulty operations due to user's programming errors with a remarkably high controllability.

While the present invention has been described with reference to the preferred embodiments shown in the drawings, it should be understood that the invention is not limited to those embodiments but includes all other possible modifications, alternations and equivalent arrangements within the scope of appended claims.

What we claim is:

1. Apparatus including a programmable timer to control a heating sequence for heating a product in stages, each stage having a selected heating level and heating time comprising:
   at least one heating source for heating said product, the output of said heating source being switchable between at least two heating levels;
   output setting means for selecting one of said heating levels;
   timer means for controlling the heating time at said selected level;
   heating time setting means for setting said timer means to provide heating at said selected level for a selected heating time;
   memory means for storing said selected heating level and heating time comprising said heating sequence;
   display means for displaying said selected heating level and heating time;
   stage recall means with independent input means for selectively displaying the heating time of each of said stages at any time;
   a main controller for controlling said heating source and each of said aforesaid means, said main controller continuously storing in said memory means the heating sequences selected for at least two of said stages and correcting the display recalled by said stage recall means from said memory and indicated on said display means when a new heating level and heating time are inputted into said apparatus by resetting said output setting means and said heating time setting means; and
   clearing means for clearing the contents of said memory means, actuation of said clear key during operation of said stage recall means causing said main controller to clear only the contents of the corresponding stage in said memory means and reediting said heating sequence.

* * * * *